(12) United States Patent
Han et al.

(10) Patent No.: US 11,574,774 B2
(45) Date of Patent: Feb. 7, 2023

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Jun Tae Han, Suwon-si (KR); Sun Ho Yoon, Suwon-si (KR); Jeong Ryeol Kim, Suwon-si (KR); Myung Hwa You, Suwon-si (KR); Young Joon Oh, Suwon-si (KR); Seul A Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/221,137

(22) Filed: Apr. 2, 2021

(65) Prior Publication Data
US 2022/0076891 A1  Mar. 10, 2022

(30) Foreign Application Priority Data
Sep. 7, 2020  (KR) .......................... 10-2020-0113998

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC ........ H01G 4/012; H01G 4/1227; H01G 4/33; H01G 4/248; H01G 4/30; H01G 4/008; H01G 4/2325; H01G 4/1218
See application file for complete search history.

(56) References Cited

U.S. PATENT DOCUMENTS

2013/0094121 A1  4/2013  Endo et al.
2019/0115153 A1*  4/2019  Park ..................... H01G 4/1227
(Continued)

FOREIGN PATENT DOCUMENTS

KR  10-2013-0040708 A  4/2013
KR  10-2019-0121158 A  10/2019

*Primary Examiner* — Michael P McFadden
(74) *Attorney, Agent, or Firm* — Morgan, Lewis & Bockius LLP

(57) ABSTRACT

A multilayer electronic component includes a body including a plurality of dielectric layers and having first and second surfaces opposing each other, third and fourth surfaces connected to the first surface and the second surface and opposing each other, and fifth and sixth surfaces connected to the first to fourth surfaces and opposing each other, a plurality of internal electrodes disposed inside of the body, exposed to the first surface and the second surface, and having one ends exposed to the third or fourth surfaces, side margin portions disposed on the first surface and the second surface, and external electrodes disposed on the third surface and the fourth surface. The side margin portions and the plurality of dielectric layers include a metal, and a total amount of the metal included in the side margin portions is greater than that of the plurality of dielectric layers.

15 Claims, 7 Drawing Sheets

(51) Int. Cl.
*H01G 4/12* (2006.01)
*H01G 4/012* (2006.01)

(56) References Cited

U.S. PATENT DOCUMENTS

| | | | |
|---|---|---|---|
| 2019/0180936 A1* | 6/2019 | Cha | H01G 4/228 |
| 2020/0035416 A1* | 1/2020 | Kwon | H01G 4/30 |
| 2020/0075254 A1 | 3/2020 | Park et al. | |
| 2020/0312555 A1* | 10/2020 | Doi | H01G 4/1227 |
| 2020/0411246 A1* | 12/2020 | Yao | H01G 4/224 |
| 2021/0098191 A1* | 4/2021 | Saito | H01G 4/1227 |

* cited by examiner

MULTILAYER ELECTRONIC COMPONENT AND METHOD OF MANUFACTURING THE SAME

CROSS-REFERENCE TO RELATED APPLICATION(S)

This application claims the benefit under 35 USC 119 (a) of Korean Patent Application No. 10-2020-0113998 filed on Sep. 7, 2020 in the Korean Intellectual Property Office, the entire disclosure of which is incorporated herein by reference for all purposes.

BACKGROUND

1. Field

The present disclosure relates to a multilayer electronic component and a method of manufacturing the same.

2. Description of Related Art

Multilayer Ceramic Capacitors (MLCC), a type of electronic component, are chip type capacitors mounted on the printed circuit boards of various electronic products such as image display devices including a liquid crystal display (LCD) and a plasma display panel (PDP), computers, smartphones and mobile phones, and the like, to charge or discharge electricity.

Such a multilayer ceramic capacitor may be used as a component of various electronic devices due to the advantages of small size, high capacity and easy mounting. As various electronic devices such as computers and mobile devices are miniaturized and more highly powered, demand for miniaturization and high capacity of multilayer ceramic capacitors is increasing.

In addition, as the industry has recently increased interest in automotive electronic components, multilayer ceramic capacitors are also required to have high reliability and high strength characteristics to be used in automobiles or infotainment systems.

To miniaturize the multilayer ceramic capacitor and to increase capacity thereof, it is required to maximize the effective area of the electrode (increasing the effective volume fraction required to implement the capacity).

To implement a small-sized, high-capacity multilayer ceramic capacitor as described above, in manufacturing a multilayer ceramic capacitor, the internal electrode is exposed in the width direction of the body, thereby maximizing the area in the width direction of the internal electrode through a marginless design. In the step before sintering after fabrication of the chip, a method of separately attaching side margin portions to the exposed surface of the electrode in the width direction of the chip for completion thereof is applied.

Although the capacity per unit volume of the capacitor may be improved by attaching the side margin portions separately, there may be a problem in that moisture resistance reliability may be deteriorated due to a decrease in the thickness of the side margin portions.

To solve this problem, a method of suppressing the penetration of moisture through the grain boundaries of the margin portion by densifying grains in the margin portion by suppressing grain growth by changing the composition of the margin dielectric sheet has been developed. However, as the margin dielectric sheet additive diffuses into the dielectric layer of the active portion (the capacitance formation portion), a problem of changing chip characteristics may occur.

Accordingly, there is a need for development of a multilayer electronic component in which reliability may be improved while minimizing the effect on the dielectric layer of the active portion and a method of manufacturing the same.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Exemplary embodiments provide a multilayer electronic component having excellent moisture resistance reliability.

Exemplary embodiments provide a multilayer electronic component having excellent internal electrode connectivity.

Exemplary embodiments provide a multilayer electronic component having excellent withstand voltage characteristics.

Exemplary embodiments provide a multilayer electronic component having miniaturization and high capacity.

According to an exemplary embodiment, a multilayer electronic component includes a body including a plurality of dielectric layers and having a first surface and a second surface opposing each other, a third surface and a fourth surface connected to the first surface and the second surface and opposing each other, and a fifth surface and a sixth surface connected to the first to fourth surfaces and opposing each other, a plurality of internal electrodes disposed inside of the body, exposed to the first surface and the second surface, and having one ends exposed to the third or fourth surfaces, side margin portions disposed on the first surface and the second surface, and external electrodes disposed on the third surface and the fourth surface. The side margin portions and the plurality of dielectric layers include a metal, and a total amount of the metal included in the side margin portions is greater than a total amount of the metal included in the plurality of dielectric layers. That is, the side margin portions contain more metal than the plurality of dielectric layers.

According to an exemplary embodiment, a multilayer electronic component includes a body including a plurality of dielectric layers and having a first surface and a second surface opposing each other in a first direction, a third surface and a fourth surface connected to the first surface and the second surface and opposing each other in a second direction, and a fifth surface and a sixth surface connected to the first to fourth surfaces and opposing each other in a third direction, a plurality of internal electrodes disposed inside of the body, exposed to the first surface and the second surface, and having one ends exposed to the third or fourth surfaces, side margin portions disposed on the first surface and the second surface, and external electrodes disposed on the third surface and the fourth surface. In a cross-section taken in the first and third directions in a central portion of the body in the second direction, when defining an area ratio occupied by a metal in the side margin portions as M and an area ratio occupied by a metal in the plurality of dielectric layers as D, M>D is satisfied.

According to an exemplary embodiment, a method of manufacturing a multilayer electronic component includes providing a first ceramic green sheet in which a plurality of first internal electrode patterns are formed at a predetermined interval and a second ceramic green sheet in which a plurality of second internal electrode patterns are formed at a predetermined interval, laminating the first ceramic green sheet and the second ceramic green sheet in such a manner that the first internal electrode pattern and the second internal electrode pattern intersect each other, to forma ceramic green sheet multilayer body, cutting the ceramic green sheet multilayer body to have side surfaces to which ends of the first internal electrode pattern and the second internal electrode pattern are exposed in a width direction, to thereby obtain a multilayer body, attaching a ceramic green sheet for a side margin portion to a side surface of the multilayer body to which the ends of the first and second internal electrode patterns are exposed, sintering the multilayer body to which the ceramic green sheet for the side margin portion is attached, heat-treating in a reducing atmosphere after the sintering, an, forming an external electrode on the multilayer body heat-treated in the reducing atmosphere. The ceramic green sheet for the side margin portion includes a metal oxide.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
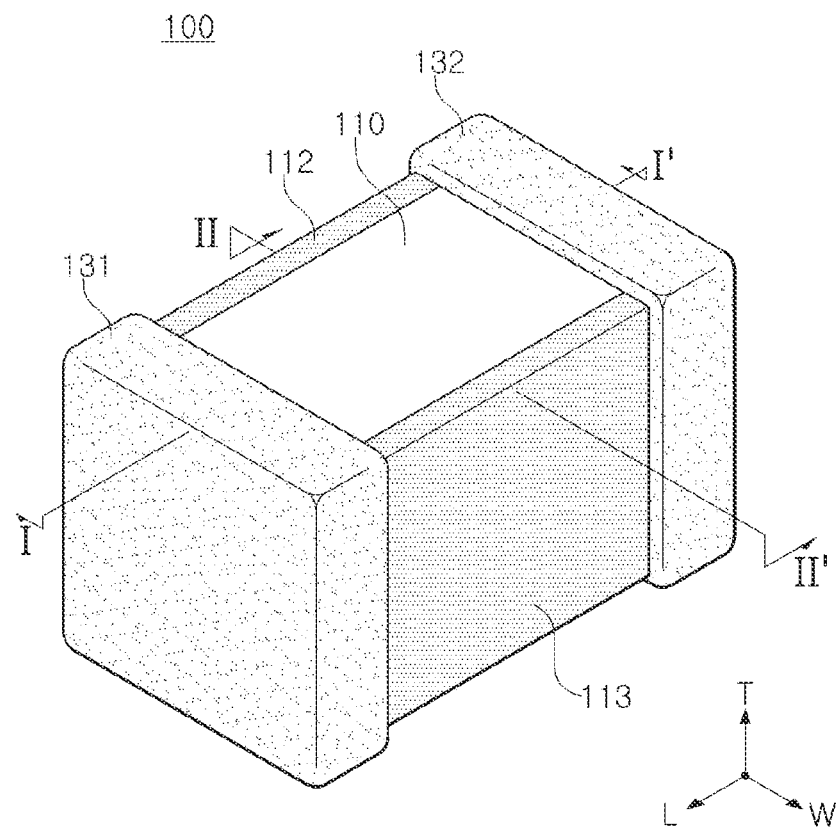
FIG. 1 is a schematic perspective view of a multilayer electronic component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

In the drawings, a W direction may be defined as a first direction or a width direction, an L direction may be defined as a second direction or a length direction, and a T direction may be defined as a third direction or a thickness direction.

Multilayer Electronic Component

FIG. 1 is a schematic perspective view of a multilayer electronic component according to an embodiment.

Figure 2:
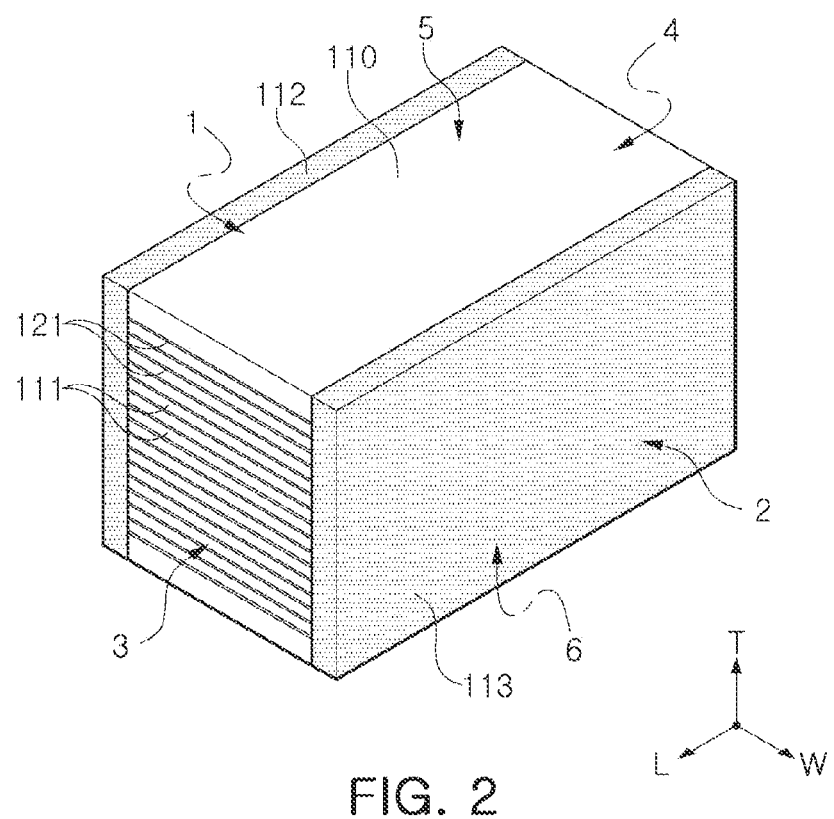
FIG. 2 is a perspective view illustrating the multilayer electronic component of FIG. 1 excluding external electrodes.

FIG. 2 is a perspective view illustrating the multilayer electronic component of FIG. 1 excluding external electrodes.

Figure 3:
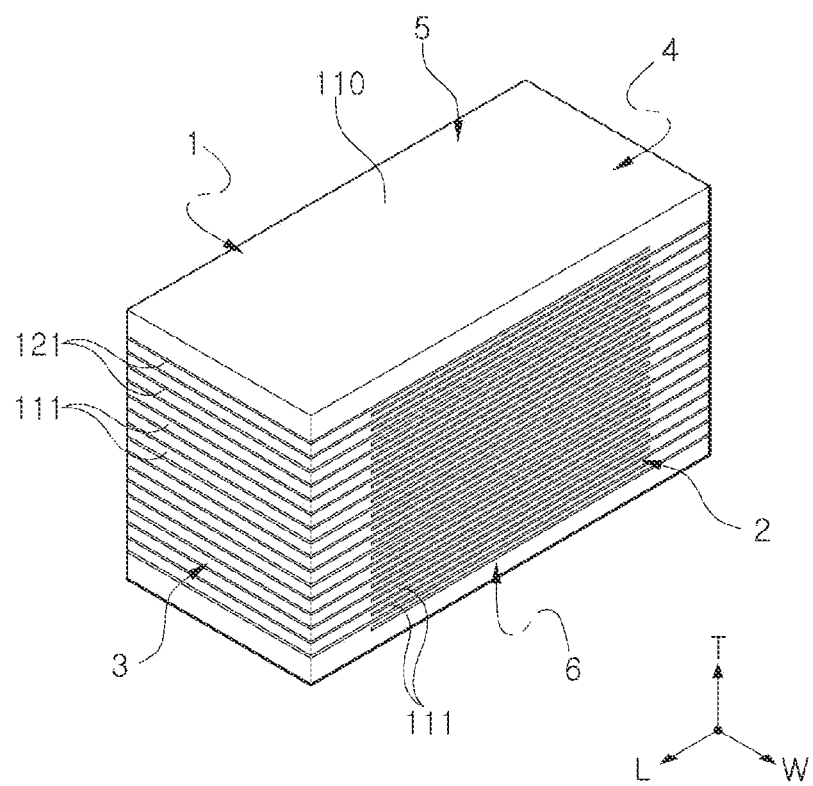
FIG. 3 is a perspective view illustrating the multilayer electronic component of FIG. 1 excluding external electrodes and side margin portions.

FIG. 3 is a perspective view illustrating the multilayer electronic component of FIG. 1 excluding external electrodes and side margin portions.

Figure 4:
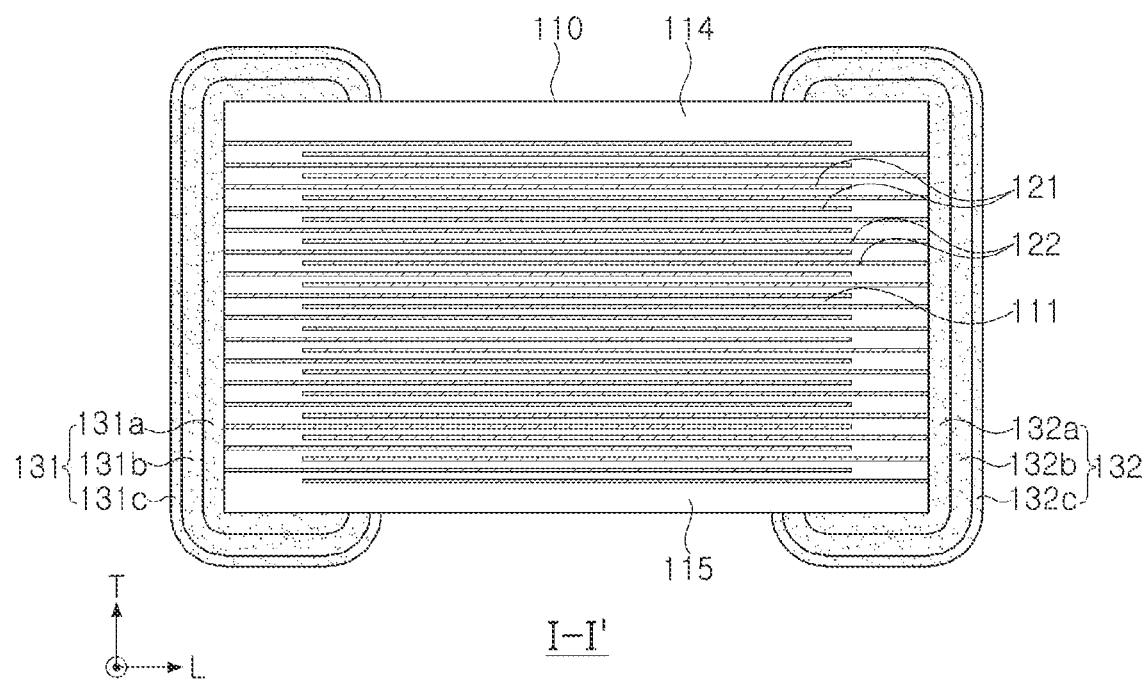
FIG. 4 is a cross-sectional view taken along line I-I' of FIG. 1.

FIG. 4 is a cross-sectional view taken along line I-I' of FIG. 1.

Figure 5:
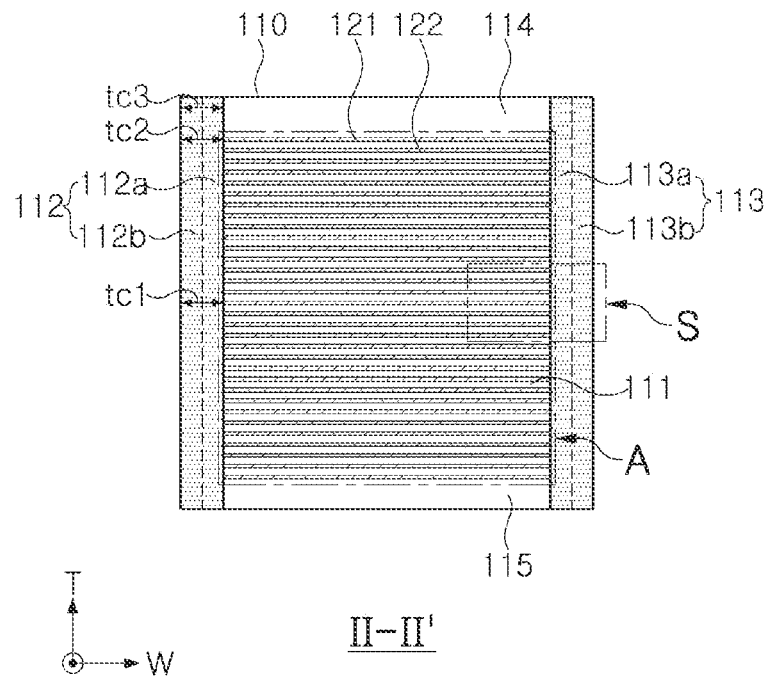
FIG. 5 is a cross-sectional view taken along line II-II' of FIG. 1.

FIG. 5 is a cross-sectional view taken along line II-II' of FIG. 1.

Figure 6:
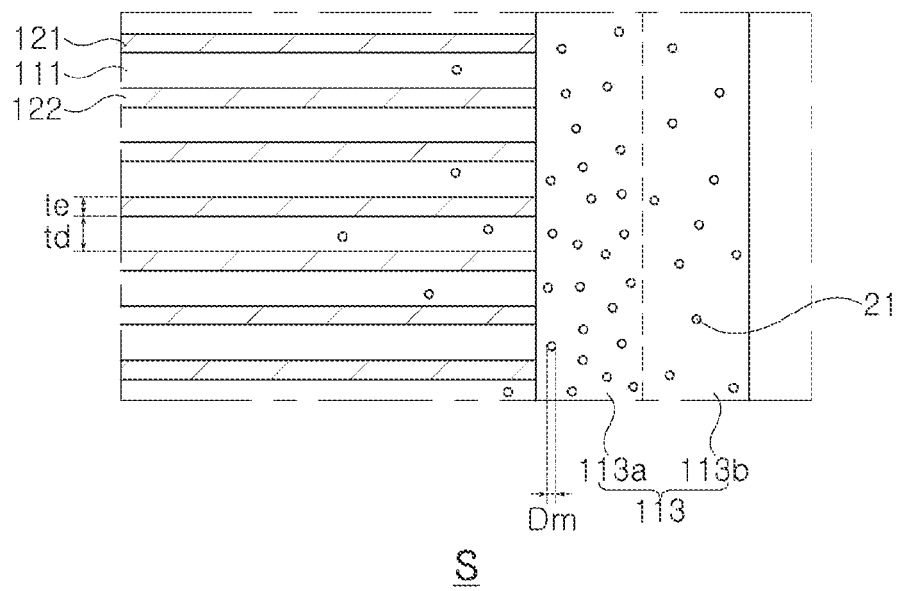
FIG. 6 is an enlarged view of area S of FIG. 5.

FIG. 6 is an enlarged view of area S of FIG. 5.

Hereinafter, a multilayer electronic component 100 according to an embodiment will be described with reference to FIGS. 1 to 6.

The multilayer electronic component 100 according to an embodiment includes a body 110 including a plurality of dielectric layers 111 and having a first surface 1 and a second surface 2 opposing each other, a third surface 3 and a fourth surface 4 connected to the first surface and the second surface and opposing each other, and a fifth surface 5 and a sixth surface 6 connected to the first to fourth surfaces and opposing each other; A plurality of internal electrodes 121 and 122 disposed inside of the body 110, exposed to the first surface 1 and the second surface 2, and having one ends exposed to the third surface 3 or the fourth surface 4; side margin portions 112 and 113 disposed on the first surface 1 and the second surface 2; and external electrodes 131 and 132 disposed on the third surface 3 and the fourth surface 4. The side margin portions 112 and 113 and the dielectric layers 111 include a metal, and a total amount of the metal included in the side margin portions 112 and 113 is greater than a total amount of the metal included in the dielectric layers 111.

In the body 110, the dielectric layers 111 and the internal electrodes 121 and 122 are alternately stacked.

There is no particular limitation on the specific shape of the body 110, but as illustrated, the body 110 may have a hexahedral shape or a shape similar thereto. Due to the shrinkage of the ceramic powder included in the body 110 during the sintering process, the body 110 may not have a hexahedral shape having complete straight lines, but may have a substantially hexahedral shape.

The body 110 may have the first and second surfaces 1 and 2 opposing each other in a first direction (W direction), the third and fourth surfaces 3 and 4 connected to the first and second surfaces 1 and 2 and opposing each other in a second direction (L direction), and the fifth and sixth surfaces 5 and 6 connected to the first and second surfaces 1 and 2, connected to the third and fourth surfaces 3 and 4 and opposing each other in a third direction (Z direction).

The plurality of dielectric layers 111 forming the body 110 are in a sintered state, and may be integrated so that the boundary between the adjacent dielectric layers 111 is difficult to discern without using a scanning electron microscope (SEM).

According to an embodiment, the raw material for forming the dielectric layer 111 is not particularly limited, as long as sufficient electrostatic capacity may be obtained therewith.

For example, a barium titanate-based material, a lead composite perovskite-based material, or a strontium titanate-based material may be used. The barium titanate-based material may include $BaTiO_3$-based ceramic powder, and examples of the ceramic powder include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ and $Ba(Ti_{1-y}Zr_y)O_3$ $(0<y<1)$ in which calcium (Ca), zirconium (Zr) or the like is partially dissolved in $BaTiO_3$.

In addition, various ceramic additives, organic solvents, binders, dispersants, etc. may be added according to the use of the present disclosure.

One ends of the plurality of internal electrodes 121 and 122 disposed inside the body 110 are exposed to the third surface 3 or the fourth surface 4 of the body.

The internal electrodes 121 and 122 may be provided as a first internal electrode 121 and a second internal electrode 122 having different polarities as a pair.

One end of the first internal electrode 121 may be exposed to the third surface 3, and one end of the second internal electrode 122 may be exposed to the fourth surface 4. The other end of the first internal electrode 121 may be spaced apart from the fourth surface 4, and the other end of the second internal electrode 122 may be disposed to be spaced apart from the third surface 3.

The external electrodes 131 and 132 may be disposed on the third and fourth surfaces 3 and 4 of the body to be connected to the internal electrodes 121 and 122.

Referring to FIG. 3, the first internal electrode 121 is formed on the dielectric layer 111. The first internal electrode 121 is not entirely formed on the dielectric layer in the length direction. For example, one end of the first internal electrode 121 is formed up to the third surface 3 to be exposed to the third surface 3, and the other end of the first internal electrode 121 may be formed at a predetermined interval from the fourth surface 4 of the body 110.

The end of the first internal electrode exposed to the third surface 3 of the body 110 is connected to the first external electrode 131.

Contrary to the first internal electrode, one end of the second internal electrode 122 is exposed to the fourth surface 4 to be connected to the second external electrode 132, and the other end of the second internal electrode 122 may be formed at a predetermined interval from the third surface 3.

The internal electrodes may be formed by stacking 400 or more layers to implement a high-capacity multilayer electronic component, but the configuration is not limited thereto.

The material of the internal electrodes 121 and 122 is not particularly limited, and a material having excellent electrical conductivity may be used. For example, the internal electrodes 121 and 122 may be formed by printing a conductive paste for internal electrodes, including at least one selected from the group consisting of nickel (Ni), copper (Cu), palladium (Pd), silver (Ag), gold (Au), platinum (Pt), tin (Sn), tungsten (W), titanium (Ti), and alloys thereof, on a ceramic green sheet.

The printing method of the conductive paste for internal electrodes may be a screen printing method or a gravure printing method, but is not limited thereto.

The body 110 may include a capacitance formation portion A including the first internal electrode 121 and the second internal electrode 122 disposed to face each other with the dielectric layer 111 interposed therebetween, to form the capacitance, and protective layers 114 and 115 formed on both end surfaces of the capacitance formation portion A in the third direction (T direction) as depicted in FIG. 5.

The capacitance formation portion A is a portion that contributes to the formation of the capacitance, and may be formed by repeatedly stacking the plurality of first and second internal electrodes 121 and 122 in the third direction (T direction) to have the dielectric layer 111 therebetween.

The protective layers 114 and 115 may be formed by laminating a single dielectric layer or two or more dielectric layers on both end surfaces of the capacitance formation portion in the third direction (T direction), respectively, in the third direction (T direction), and may basically serve to prevent damage to the internal electrode due to physical or chemical stress.

The protective layers 114 and 115 do not include internal electrodes, and may include the same material as the dielectric layer 111.

The side margin portions 112 and 113 are disposed on the first surface 1 and the second surface 2 of the body. The side margin portions may include a first side margin portion 112 disposed on the first surface 1 and a second side margin portion 113 disposed on the second surface 2.

Respective side portions of the plurality of internal electrodes 121 and 122 are exposed on the first surface 1 and the second surface 2, which are the widthwise sides of the body 110, and the first side margin portion 112 and the second side margin portion 113 may be disposed on the exposed side portions.

The side margin portions 112 and 113 may fundamentally serve to prevent damage to the internal electrodes 121 and 122 due to physical or chemical stress.

The thicknesses of the first and second side margin portions 112 and 113 in the first direction are not particularly limited. For example, a thickness of each of the first and second side margin portions 112 and 113 in the first direction may be 2 μm or more and 10 μm or less.

If the thickness of each of the first and second side margin portions 112 and 113 in the first direction is less than 2 μm, it may be difficult to prevent short circuits of the internal electrodes 121 and 122 exposed to the sides, and if the thickness exceeds 10 μm, the overlapping area of the internal electrodes 121 and 122 is relatively reduced, and thus, the effect of securing high capacitance due to the introduction of the side margin portions may be negligible.

Referring to FIG. 6 in which the S region of FIG. 5 is enlarged, the side margin portion 113 and the dielectric layer 111 include a metal 21, and the total amount of the metal included in the side margin portion 113 is greater than the total amount of the metal included in the dielectric layer 111.

Accordingly, the internal electrode connectivity may be improved by suppressing a relatively large amount of metal components of the internal electrode from flowing out to the side margin portions, and moisture resistance reliability may be improved by blocking the water penetration route of the side margin portions.

In general, a metal contained in the internal electrode partially diffuses into the dielectric layer and the side margin portions during the sintering process and precipitates in the form of metal oxide at the grain boundaries during cooling after sintering.

Figure 7A:
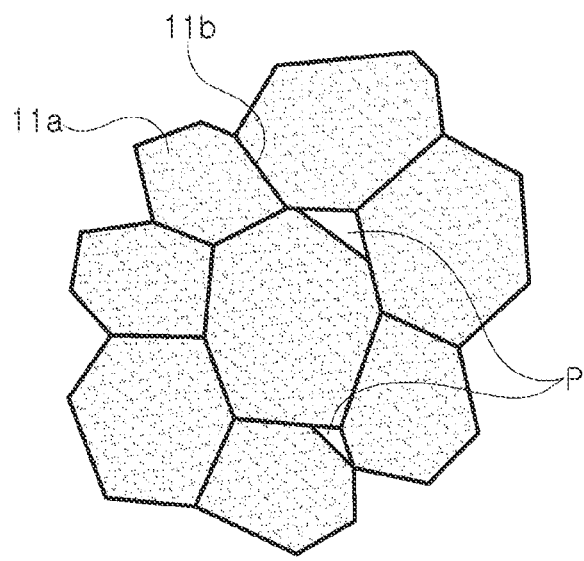
FIG. 7A illustrates crystal grains of a side margin portion after sintering and before reduction heat treatment.
Figure 7B:
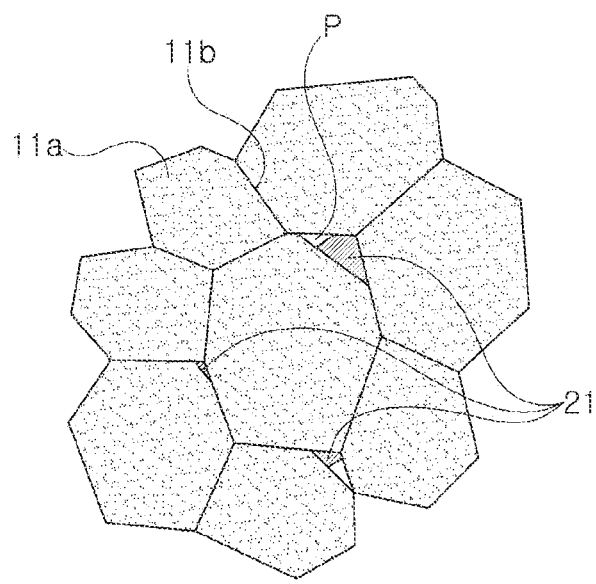
FIG. 7B illustrates crystal grains of a side margin portion after sintering and reduction heat treatment.

FIG. 7A illustrates crystal grains of the side margin portion after sintering and before reduction heat treatment, and FIG. 7B illustrates the crystal grains after reduction heat treatment of the side margin portion of FIG. 7A.

Referring to FIG. 7A, the side margin portion includes a plurality of dielectric grains 11a and pores P after sintering, and metal oxides are deposited at grain boundaries 11b of the plurality of dielectric grains during cooling after sintering. The metal oxide disposed in the grain boundary 11b may deteriorate moisture resistance reliability. For example, nickel oxide (NiO) is easily combined with moisture to form $Ni(OH)_2$, and moisture absorption by $Ni(OH)_2$ facilitates moisture penetration into the chip, thereby deteriorating moisture resistance reliability.

When the crystal grains of the side margin portions of FIG. 7A are subjected to reduction heat treatment, NiO disposed at the grain boundaries 11b is reduced to Ni, and moves to the pores P to aggregate. Referring to FIG. 7B, it can be seen that the metal 21 is disposed in the form of particles in the pores P by the reduction heat treatment. Accordingly, NiO, which causes moisture penetration, is removed, and the metal 21 is aggregated in the pores P to block the moisture penetration route, thereby improving reliability of moisture resistance.

However, in the case of relying on metal oxides that naturally diffuse in the internal electrodes during sintering, there is a concern that electrode connectivity may be deteriorated as a relatively large amount of metal in the internal electrodes is leaked, and it may be difficult to sufficiently suppress pores in the side margin portions.

In detail, in the case of attaching a separate side margin portion as in the present disclosure, since the amount of metal diffused into the margin may be greater than that in a case in which the separate side margin is not attached, there is a high possibility that electrode connectivity may be deteriorated.

Accordingly, in an exemplary embodiment of the present disclosure, by adding a metal oxide to the dielectric sheet for the side margin portion, a relatively large amount of metal is prevented from flowing out of the internal electrode to the side margin portion during sintering, thereby improving the internal electrode connectivity, and by allowing the metal 21 to sufficiently aggregate in the pore (P) after reduction heat treatment to block the water penetration route, the moisture resistance reliability may be improved.

As a metal oxide is additionally added to the dielectric sheet for the side margin portion, in an embodiment, the total amount of the metal included in the side margin portion 113 may be higher than the total amount of the metal included in the dielectric layer 111. The metal oxide added to the dielectric sheet includes, but not limited to, nickel oxide (NiO), cooper oxide (CuO), tin oxide ($SnO_2$), etc.

Meanwhile, in a case in which the metal oxide is not additionally added to the dielectric sheet for the side margin portion, it is difficult to have a structure in which the total amount of the metal included in the side margin portion 113 is higher than that of the dielectric layer 111, and it may be difficult to have a structure in which metal is disposed in a region adjacent to the outer side surface of the side margin portion.

In addition, the side margin portions 112 and 113 according to an embodiment include the plurality of dielectric grains 11a and pores P, and the metal 21 may be disposed in the pores P. Accordingly, the metal 21 disposed in the pore P serves to block the moisture penetration path, thereby improving the moisture resistance reliability.

The type of the metal 21 does not need to be particularly limited, and may be, for example, Ni.

However, to effectively suppress leakage of the metal in the internal electrode during sintering, it may be advantageous that the metal 21 included in the side margin portion is the same type as the metal included in the internal electrode. Accordingly, the metal included in the side margin portions 112 and 113 and the dielectric layer 111 may be the same type of metal as the metal included in the internal electrodes 121 and 122.

Referring to FIG. 6, in the multilayer electronic component according to an embodiment, a diameter D of the metal 21 disposed in the side margin portions 112 and 113 may be 0.8 times or less a thickness td of the dielectric layer 111.

Due to the metal 21 disposed inside the side margin portion, an effect of reducing the distance between the internal electrodes 121 and 122 may occur, resulting in electric field concentration, which may cause failure such as short circuits.

For example, in a case in which a neutral conductor penetrates between the internal electrodes 121 and 122 having a potential difference, the electric charges in the conductor are rearranged according to the properties of the conductor, and the rearranged neutral conductor may have the same effect as the electrode, and, as a result, since the distance between the internal electrodes is reduced, the electric field strength between the internal electrodes is increased.

In detail, if the diameter of the metal D disposed in the side margin portions 112 and 113 is more than 0.8 times the thickness td of the dielectric layer 111, the possibility of occurrence of a short circuit increases due to the effect of increasing the electric field strength between the internal electrodes 121 and 122.

Accordingly, according to an embodiment of the present disclosure, short defects may be prevented by controlling the diameter Dm of the metal 21 included in the side margin portions 112 and 113 to be 0.8 times or less than the thickness td of the dielectric layer 111.

On the other hand, the smaller the diameter Dm of the metal 21 is, the lower the likelihood of short circuit failure becomes, and thus, the lower limit of the ratio of the diameter Dm of the metal 21 to the thickness td of the dielectric layer 111 is not particularly specified.

In this case, the diameter Dm of the metal 21 may refer to an average size measured as a circle equivalent diameter. An average size Dm may be measured by analyzing a cross-section in the width-thickness direction (W-T cross-section) at the center of the body in the length direction with a Scanning Electron Microscope (SEM) and an Energy Disperse X-Ray Spectrometer (EDS). In detail, Dm is the average value of the diameters of metals obtained by observing the margin of the middle region among the regions in which the W-T cross section is divided into 3 divisions in the T direction with a magnification of 10000 at 3 views.

The side margin portions 112 and 113 are divided into first regions 112a and 113a adjacent to the internal electrodes 121 and 122 and second regions 112b and 113b adjacent to the external side surface of the side margin portions, and the total amount of the metal included in the first regions 112a and 113a may be greater than the total amount of the metal included in the second regions 112b and 113b, and the total amount of the metal included in the second regions 112b and 113b may be greater than the total amount of the metal included in the dielectric layer 111.

In a case in which no additional metal oxide is added to the dielectric sheet for the side margin portion, it is difficult to have a structure in which the total amount of the metal contained in the side margin portion 113 is greater than the total amount of the metal included in the dielectric layer 111, and a region adjacent to the external side surface of the side margin portion may be difficult to have a structure in which the metal is disposed therein.

Meanwhile, according to an embodiment of the present disclosure, when the metal oxide is additionally added to the dielectric sheet for the side margin portion, the second regions 112b and 113b may include more metal than that of the dielectric layer 111, and since the metal content leaked from the internal electrode is added to the first regions 112a and 113a, the first regions 112a and 113a may have a higher metal content than the second regions 112b and 113b.

According to an embodiment, since the metal 21 contained in the side margin portions 112 and 113 may suppress the leakage of the metal contained in the internal electrodes 121 and 122, the electrode of the internal electrode may be effectively suppressed from being disconnected.

Accordingly, the internal electrodes 121 and 122 may have connectivity of internal electrode exceeding 80%. When the connectivity of the internal electrodes is 80% or less, it may be difficult to sufficiently secure capacitance. Accordingly, the internal electrodes 121 and 122 may, in detail, have electrode connectivity exceeding 80%, in more detail, 81% or more, and in even more detail, 82% or more.

The internal electrode connectivity may be defined as the ratio of the actual length of the internal electrode to the total length of the internal electrode. In this case, the total length of the internal electrode is a length calculated including a portion due to electrode breakage, and the actual length of an internal electrode is a length calculated excluding a portion due to electrode breakage.

For example, the cross-section (W-T cross-section) taken in the first and third directions in the central portion of the body in the second direction (L direction) may be analyzed and measured by a scanning electron microscope (SEM) and an Energy Disperse X-Ray Spectrometer (EDS). In detail, the internal electrode connectivity may be an average value obtained by observing the internal electrode in a middle region of regions in which the W-T cross-section is divided into three portions in the T direction at a magnification of 10000 for three views.

Referring to FIG. 5, a ratio of a thickness tc2 of a region of the first or second side margin portion in contact with the end of the internal electrode disposed at the outermost part with respect to a thickness tc1 of a region of the first or second side margin portion in contact with the end of the internal electrode disposed in the central portion among the plurality of internal electrodes 121 and 122 may be less than or equal to 1.0.

The lower limit of the ratio of the thickness tc2 of the first or second side margin region in contact with the end of the outermost internal electrode to the thickness tc1 of the first or second side margin region in contact with the end of the intermediate internal electrode is not particularly limited, but may be, in detail, 0.9 or more.

According to an embodiment, since the first or second side margin portion 112 or 113 is formed by attaching the ceramic green sheet for the side margin portion to the side surface of the body 110, unlike the related art, the thickness of the first or second side margin portion 112 or 113 for each position is constant.

For example, in the related art, since the side margin portion is formed by applying or printing ceramic slurry, the deviation of thicknesses of the side margin portion was relatively great depending on locations thereof.

In detail, in the related art case, the thickness of the region of the first or second side margin portion that contacts the end of the internal electrode disposed in the center of the body is thicker than that of the other regions.

For example, in the related art case, compared to the thickness of the first or second side margin region in contact with the end of the intermediate internal electrode, the ratio of the thickness of the first or second side margin region in contact with the end of the internal electrode disposed at the outermost is less than 0.9, and the deviation is relatively great.

As described above, in the related art case in which the deviation in the thickness of the side margin portion in respective positions is relatively great, it is difficult to secure high capacitance, since the part occupied by the side margin portion is relatively great in the same size multilayer electronic component so that the size of the capacitance formation portion may not be greatly secured.

Meanwhile, in an embodiment of the present disclosure, the ratio of the thickness tc2 of the first or second side margin region in contact with the end of the internal electrode disposed at the outermost side, with respect to the thickness tc1 of the first or second side margin region in contact with the end of the internal electrode disposed at the center of the plurality of internal electrodes 121 and 122 is 0.9 or more and 1.0 or less, and thus, since the thicknesses of the first and second side margin portions 112 and 113 in the first direction may be reduced, the size of the capacitance formation portion may be secured relatively greatly.

In an embodiment of the present disclosure, unlike the related art, since the ceramic green sheet is attached to the side surface of the body, the thickness of the first or second side margin in respective positions is constant.

Accordingly, a high-capacity multilayer electronic component may be implemented.

On the other hand, referring to FIG. 5, a ratio of a thickness tc3 of the first or second side margin region in contact with the edge of the body 110 to the thickness tc1 of the first or second side margin region in contact with the end of the internal electrode disposed in the center among the plurality of inner electrodes 121 and 122, may be 1.0 or less.

The lower limit of the ratio of thickness tc3 of the first or second side margin region in contact with the edge of the body 110 to the thickness tc1 of the first or second side margin region in contact with the end of the internal electrode disposed in the center may be, in detail, 0.9 or more. The thicknesses tc1, tc2 and tc3 of the first and second side margin region may be measured by analyzing a cross-section in the width-thickness direction (W-T cross-section) at the center of the body in the length direction.

Due to the above characteristics, the size of the capacitance formation portion may be secured because there is little variation in thickness for each region of the side margin portion, and thus, a high-capacity multilayer electronic component may be implemented.

The external electrodes 131 and 132 are disposed on the third surface 3 and the fourth surface 4 of the body 110.

As illustrated in FIG. 4, the first and second external electrodes 131 and 132 disposed on the third and fourth surfaces 3 and 4 of the body 110 and connected to the first and second internal electrodes 121 and 122, respectively, may be included.

In this embodiment, a structure in which the multilayer electronic component 100 has two external electrodes 131 and 132 is described, but the number or shape of the external electrodes 131 and 132 may be changed depending on the shape of the internal electrodes 121 and 122 or other uses.

Further, referring to FIG. 1, the external electrodes 131 and 132 may be disposed to cover portions of the side margin portions 112 and 113.

The external electrodes 131 and 132 may be formed of any material as long as the material has electrical conductivity, such as metal, and a detailed material may be determined in consideration of electrical characteristics and structural stability, and further, the external electrodes 131 and 132 may have a multilayer structure.

For example, for the multilayer structure of the external electrodes 131 and 132, as illustrated in FIG. 4, the external electrodes 131 and 132 may include electrode layers 131a and 132a disposed on the body 110, conductive resin layers 131b and 132b disposed on the electrode layers 131a and 132a, and plating layers 131c and 132c disposed on the conductive resin layers 131b and 132b.

However, the present disclosure is not limited thereto, and the external electrode may have a dual-layer structure including electrode layers 131a and 132a and plating layers disposed on the electrode layers 131a and 132a.

The electrode layers 131a and 132a may be firing electrodes including a conductive metal and glass. In addition, the electrode layers 131a and 132a may also be formed by transferring a sheet including a conductive metal onto the body. In addition, the first and second electrode layers 131a and 132a may be formed using an Atomic Layer Deposition (ALD) method, a Molecular Layer Deposition (MLD) method, a Chemical Vapor Deposition (CVD) method, a sputtering method, or the like.

The conductive metal used for the electrode layers 131a and 132a is not particularly limited as long as it is a material that may be electrically connected to the internal electrode to form a capacitance. For example, the electrode layers 131a and 132a may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The conductive resin layers 131b and 132b may be resin-based electrodes including a conductive metal and a resin.

The conductive metal used for the conductive resin layers 131b and 132b is not particularly limited as long as it is a material that may be electrically connected to the internal electrode to form a capacitance. For example, the conductive resin layers 131b and 132b may include one or more selected from the group consisting of nickel (Ni), copper (Cu), palladium (Pd), silver (Ag), gold (Au), platinum (Pt), tin (Sn), tungsten (W), titanium (Ti), and alloys thereof.

For a more detailed example of the plating layers 131b and 132b, the plating layers 131b and 132b may be a Ni plating layer or an Sn plating layer, and may have a form in which the Ni plating layer and the Sn plating layer are sequentially formed on the electrode layers 131a and 132a or may have a form in which the Sn plating layer, the Ni plating layer, and the Sn plating layer are sequentially formed. In addition, the plating layers 131b and 132b may include a plurality of Ni plating layers and/or a plurality of Sn plating layers.

Hereinafter, a multilayer electronic component according to another embodiment will be described in detail. However, the same drawings and the same reference numerals as in the embodiment may be applied. In addition, in order to avoid overlapping descriptions, contents overlapping with the multilayer electronic component according to the embodiment will be omitted.

A multilayer electronic component 100 according to another embodiment includes a body 110 including a plurality of dielectric layers 111 and having a first surface 1 and a second surface 2 opposing each other in a first direction (W direction), a third surface 3 and a fourth surface 4 connected to the first and second surfaces and opposing each other in a second direction (L direction), and a fifth surface 5 and a sixth surface 6 connected to the first to fourth surfaces and opposing each other in a third direction (T direction); a plurality of internal electrodes 121 and 122 disposed inside of the body, exposed to the first and second surfaces and having one end exposed to the third or fourth surfaces; side margin portions 112 and 113 disposed on the first and second surfaces; and external electrodes 131 and 132 disposed on the third and fourth surfaces. The side margin portions 112 and 113 and the dielectric layer 111 include a metal, and in a cross section (W-T cross-section) taken in the first and third directions in the central portion of the body in the second direction (L direction), when defining the area ratio occupied by metal in the side margin portion as M (area %) and defining the area ratio occupied by metal in the dielectric layer as D (area %), M>D is satisfied.

According to another embodiment, in the cross section (W-T section) taken in the first and third directions in the central portion of the body in the second direction (L direction), when the area ratio of the metal in the side margin portion is defined as M (area %), and the ratio of the area occupied by the metal in the dielectric layer is defined as D (area %), M>D is satisfied. For example, the total amount of the metal included in the side margin portion 113 is greater than the total amount of the metal included in the dielectric layer 111. Therefore, as described in the embodiment, internal electrode connectivity may be improved and moisture resistance reliability may be improved.

In this case, the central portion in the second direction (L direction) refers to a middle region when a portion between the third and fourth surfaces are divided into three equal parts. For example, the central portion in the second direction (L direction) may mean an intermediate point between the third and fourth surfaces.

Further, M and D may be measured by analyzing the W-T cross-section with a Scanning Electron Microscope (SEM) and an Energy Dispersive X-Ray Spectrometer (EDS). In detail, M may be an average value obtained by observing a margin portion of the middle region with a magnification of 10000, among the regions obtained by dividing the W-T section into three sections in the T direction, and D may be an average value obtained by observing a dielectric layer in the middle region with a magnification of 10000 at 3 views, among the regions obtained by dividing the W-T section into three sections in the T direction.

In this case, M may be 0.18 area % or more and 0.42 area % or less.

If M is less than 0.18 area %, the effect of suppressing the leakage of metal in the internal electrodes 121 and 122 during sintering may be insufficient, and thus, there is a possibility that the connectivity of the internal electrodes may be lowered, and the water penetration route of the side margin portion is not sufficiently blocked, resulting in poor moisture resistance reliability. Therefore, the lower limit of M is preferably 0.18 area %, in more detail, 0.19 area %, and in further detail, 0.20 area %.

On the other hand, if M exceeds 0.42 area %, the effect of reducing the distance between the internal electrodes 121 and 122 due to the metal 21 disposed inside the side margin portions 112 and 113 occurs, resulting in electric field concentration. As a result, failure such as short circuits may occur, and breakdown voltage (BDV) may be lowered. Therefore, the upper limit of M may be 0.42 area %, in detail, 0.40 area %, and in further detail, 0.38 area %.

In addition, D may be 0.25 area % or less.

If the D exceeds 0.25 area %, an effect of reducing the distance between the internal electrodes 121 and 122 occurs due to the metal 21 disposed inside the dielectric layer 111, resulting in electric field concentration and thus causing the occurrence of failure such as short circuits, and there is a concern that the breakdown voltage (BDV) may decrease. Therefore, the upper limit of D may be preferably 0.25 area %, more preferably 0.23 area %, and even more preferably 0.21 area %.

On the other hand, the lower limit of D does not need to be particularly limited. For example, D may be 0.16 area % or more. For example, if controlling the D to be less than 0.16 area %, an additional process may be required or excessive cost may be consumed.

In addition, M may be greater than D by 0.02 area % or more.

If the area % difference between M and D is too low, the effect of suppressing the leakage of metal in the internal electrodes 121 and 122 during sintering is insufficient, or the breakdown voltage (BDV) may be lowered.

In addition, the side margin portions 112 and 113 are divided into first regions 112a and 113a adjacent to the internal electrodes and second regions 112b and 113b adjacent to external side surfaces of the side margin portions, and when defining an area ratio occupied by a metal in the first region as M1 (area %) and defining an area ratio occupied by a metal in the second region as M2 (area %), M1>M2>D may be satisfied.

For example, the side margin portions 112 and 113 are divided into the first regions 112a and 113a adjacent to the internal electrodes 121 and 122 and the second regions 112b and 113b adjacent to the external side surfaces of the side margin portions. The total amount of the metal included in the first regions 112a and 113a is greater than the total amount of the metal included in the second regions 112b and 113b, and the total amount of the metal included in the second regions 112b and 113b may be greater than the total amount of the metal included in the dielectric layer 111.

If the metal oxide is not additionally added to the dielectric sheet for the side margin portion, it may be difficult to have a structure of M>D, and it may also be difficult to form a structure of M2>D.

Meanwhile, when the metal oxide is additionally added to the dielectric sheet for the side margin portion according to an embodiment of the present disclosure, M2>D may be satisfied, and since the metal content leaked from the internal electrode is added to the first regions 112a and 113a, M1>M2 may be satisfied.

FIGS. 8A to 8F are cross-sectional views and perspective views schematically illustrating a method of manufacturing a multilayer electronic component according to still another embodiment.

Hereinafter, a method of manufacturing a multilayer electronic component according to another embodiment will be described in detail with reference to FIGS. 8A to 8F.

A method of manufacturing a multilayer electronic component according to another embodiment includes providing a first ceramic green sheet on which a plurality of first internal electrode patterns are formed at a predetermined interval and a second ceramic green sheet on which a plurality of second internal electrode patterns are formed at a predetermined interval; laminating the first ceramic green sheet and the second ceramic green sheet in such a manner that the first internal electrode patterns and the second internal electrode patterns intersect each other, to forma ceramic green sheet multilayer body; cutting the ceramic green sheet multilayer body to obtain a multilayer body, to have side surfaces to which ends of the first internal electrode patterns and the second internal electrode patterns are exposed in a width direction; attaching a ceramic green sheet for a side margin portion to a side surface of the multilayer body to which the ends of the first and second internal electrode patterns are exposed; sintering the multilayer body to which the ceramic green sheet for the side margin portion is attached; heat-treating in a reducing atmosphere after the sintering; and forming an external electrode on the multilayer body heat-treated in the reducing atmosphere. The ceramic green sheet for the side margin portion includes a metal oxide.

Figure 8A:
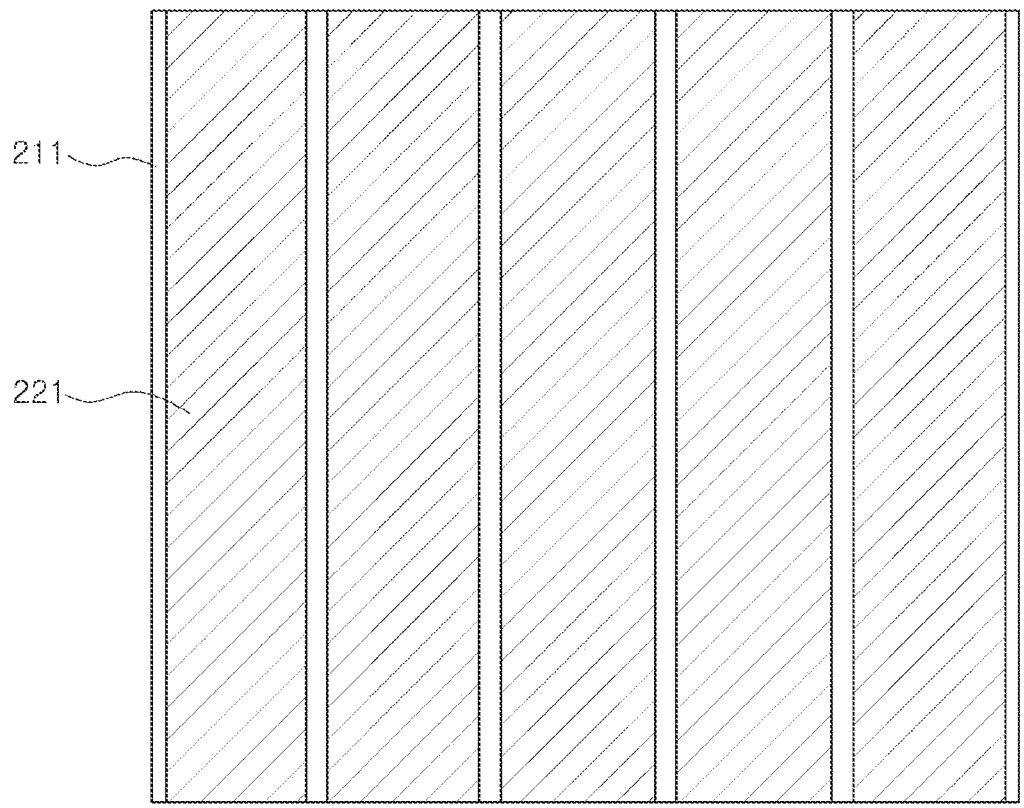
FIGS. 8A to 8F are cross-sectional views and perspective views schematically illustrating a method of manufacturing a multilayer electronic component according to another exemplary embodiment.

As illustrated in FIG. 8A, a plurality of stripe-shaped first internal electrode patterns 221 are formed on a ceramic green sheet 211 with a predetermined interval therebetween. The plurality of stripe-shaped first internal electrode patterns 221 may be formed to be parallel to each other.

The ceramic green sheet 211 may be formed of a ceramic paste including ceramic powder, an organic solvent, and an organic binder.

The ceramic powder is a material having a high dielectric constant, but is not limited thereto, but may include a barium titanate ($BaTiO_3$)-based material, a lead composite perovskite-based material, or a strontium titanate ($SrTiO_3$)-based material, and in detail, may be barium titanate ($BaTiO_3$) powder. When the ceramic green sheet 211 is sintered, the ceramic green sheet becomes a dielectric layer 111 constituting the body 110.

The stripe-shaped first internal electrode pattern 221 may be formed using an internal electrode paste containing a conductive metal. The conductive metal is not particularly limited thereto, but may include one or more metals selected from the group consisting of nickel (Ni), copper (Cu), palladium (Pd), silver (Ag), gold (Au), platinum (Pt), tin (Sn), tungsten (W), titanium (Ti), and alloys thereof.

A method of forming the stripe-shaped first internal electrode pattern 221 on the ceramic green sheet 211 is not particularly limited, but may be formed by, for example, a printing method such as a screen printing method or a gravure printing method.

Further, although not illustrated, a plurality of stripe-shaped second internal electrode patterns 222 may be formed on another ceramic green sheet 211 with a predetermined interval therebetween.

Hereinafter, the ceramic green sheet on which the first internal electrode pattern 221 is formed may be referred to as a first ceramic green sheet, and the ceramic green sheet on which the second internal electrode pattern 222 is formed may be referred to as a second ceramic green sheet.

Figure 8B:
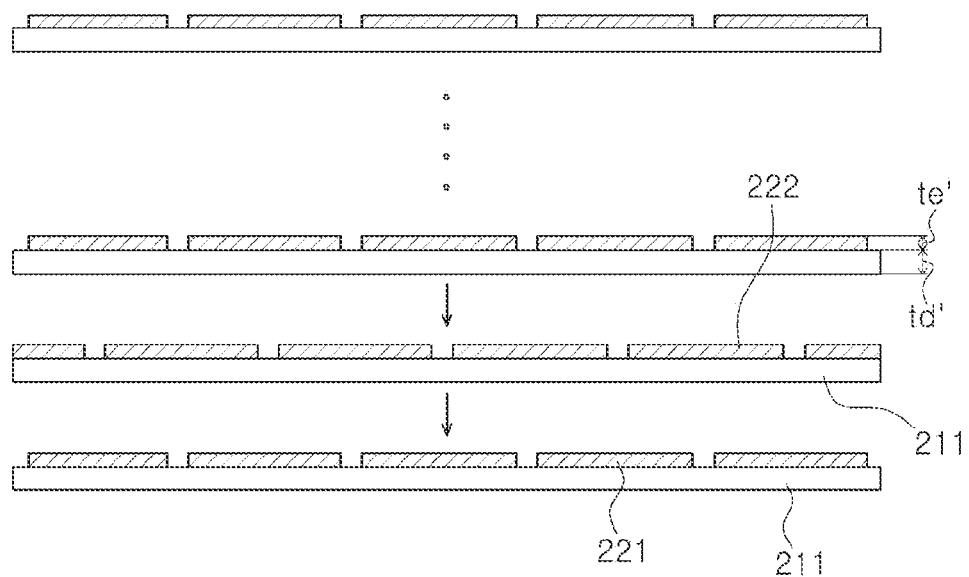

Next, as illustrated in FIG. 8B, the first and second ceramic green sheets may be alternately laminated so that the stripe-shaped first internal electrode pattern 221 and the stripe-shaped second internal electrode pattern 222 are stacked alternately.

Thereafter, the stripe-shaped first internal electrode pattern 221 may become a first internal electrode 121, and the stripe-shaped second internal electrode pattern 222 may become a second internal electrode 122.

In this case, a thickness td' of the first and second ceramic green sheets may be 0.6 µm or less, and a thickness te' of the first and second internal electrode patterns may be 0.5 µm or less.

Accordingly, a micro-miniature high-capacity multilayer electronic component having a thin film in which a thickness td of the dielectric layer is 0.4 µm or less and a thickness te of the internal electrode is 0.4 µm or less may be implemented.

In an embodiment of the present disclosure, the thickness of the dielectric layer refers to an average thickness of a dielectric layer that is disposed between internal electrode layers 121 and 122. For this embodiment, the average thickness of the dielectric layer is measured by image-scanning a cross-section in the length direction of the multilayer body 110 through a scanning electron microscope (SEM). For example, the average thickness of the dielectric layer is acquired by measuring thicknesses of a dielectric layer in three or more positions in the length direction thereof, the three or more positions being located at approximately equal intervals, from an extracted image of the dielectric layer obtained by scanning a cross section taken in a length-thickness direction (L-T) at the center of the body 110 in the width direction, through the SEM. Alternatively, the three or more positions may be located at non-equal intervals. The measured thickness values are then averaged to provide an average thickness value for the dielectric layer. Other techniques can also be used to determine an average thickness for the dielectric layer that are equivalent to the present embodiment.

In an embodiment of the present disclosure, the thickness of the internal electrode layer refers to an average thickness of an internal electrode layer. For this embodiment, the average thickness of the internal electrode layer is measured by image-scanning a cross-section in the length direction of the multilayer body 110 through a scanning electron microscope (SEM). For example, the average thickness of the internal electrode layer is acquired by measuring thicknesses of a internal electrode layer in three or more positions in the length direction thereof, the three or more positions being located at approximately equal intervals, from an extracted image of the internal electrode layer obtained by scanning a cross section taken in a length-thickness direction (L-T) at the center of the body 110 in the width direction, through the SEM. Alternatively, the three or more positions may be located at non-equal intervals. The measured thickness values are then averaged to provide an average thickness value for the internal electrode layer. Other techniques can also be used to determine an average thickness for the internal electrode layer that are equivalent to the present embodiment.

Figure 8C:
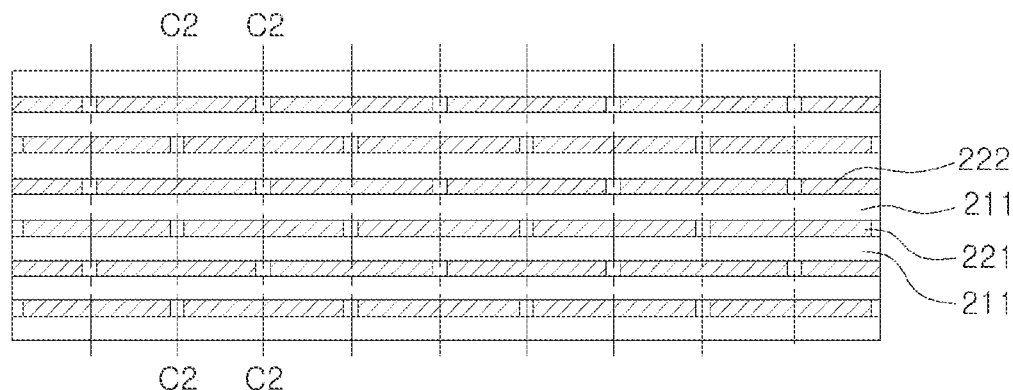
Figure 8D:
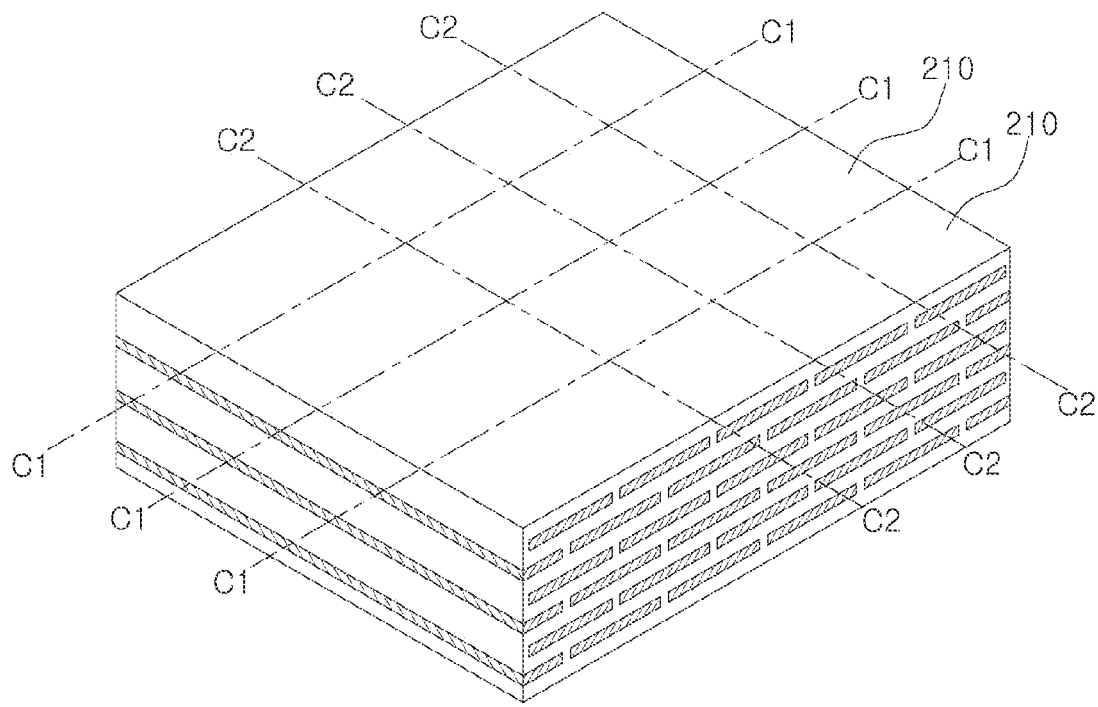

FIG. 8C is a cross-sectional view illustrating a ceramic green sheet multilayer body 220 in which first and second ceramic green sheets are laminated according to an exemplary embodiment, and FIG. 8D is a perspective view illustrating the ceramic green sheet multilayer body 220 in which first and second ceramic green sheets are laminated according to an exemplary embodiment.

Referring to FIGS. 8C and 8D, a first ceramic green sheet on which a plurality of parallel stripe-shaped first internal electrode patterns 221 are printed and a second ceramic green sheet on which a plurality of parallel stripe-shaped second internal electrode patterns 222 are printed are laminated alternately.

In detail, the first ceramic green sheet and the second ceramic green sheet are laminated, in such a manner that a central portion of the stripe-shaped first internal electrode pattern 221 printed on the first ceramic green sheet and a space between the stripe-shaped second internal electrode patterns 222 printed on the second ceramic green sheet overlap each other.

Next, as illustrated in FIG. 8D, the ceramic green sheet multilayer body 220 is cut to traverse the plurality of stripe-shaped first internal electrode patterns 221 and the plurality of stripe-shaped second internal electrode patterns 222. For example, the ceramic green sheet multilayer body 210 may be a multilayer body 210 obtained by cutting along cutting lines C1-C1 and C2-C2 perpendicular to each other.

In more detail, the stripe-shaped first internal electrode pattern 221 and the stripe-shaped second internal electrode pattern 222 may be cut in the length direction and divided into a plurality of internal electrodes having a predetermined width. In this case, the laminated ceramic green sheet is also cut together with the internal electrode patterns. Accordingly, the dielectric layer may be formed to have the same width as the width of the internal electrode.

The ceramic green sheet multilayer body 210 may also be cut along the C2-C2 cutting line to form individual bodies. For example, before forming the first side margin portion and the second side margin portion, a plurality of multilayer bodies 210 may be formed by cutting the rod-shaped multilayer body into individual bodies along the C2-C2 cutting line.

For example, the rod-shaped laminate may be cut so that an overlapping portion between, the central portion of the first internal electrode and a predetermined gap formed between the second internal electrodes, is cut by the same cutting line. Accordingly, one ends of the first internal electrode and the second internal electrode may be alternately exposed on the cut surface.

Thereafter, a first side margin portion and a second side margin portion may be formed on the first and second side surfaces of the multilayer body 210.

Figure 8E:
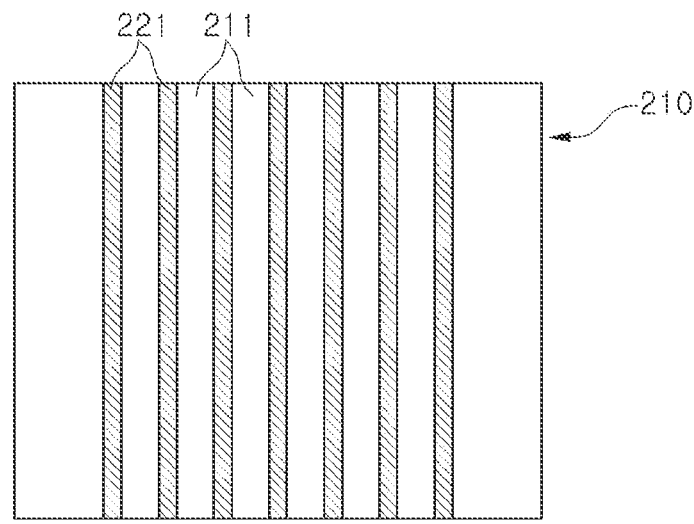

Next, as illustrated in FIG. 8E, a ceramic green sheet 212 for the side margin portion may be attached to side surfaces of the multilayer body 210 to which the ends of the first and second internal electrode patterns are exposed.

A first side margin portion may be formed by attaching the ceramic green sheet 212 for the side margin portion to the first side surface of the multilayer body 210, and thereafter, a second side margin portion may be formed by attaching the ceramic green sheet 212 for the side margin portion to the second side surface of the multilayer body 220.

In detail, in a method of forming the first side margin portion, the ceramic green sheet 212 for the side margin portion is disposed on a punched elastic material 300 formed of rubber.

Next, after rotating the multilayer body 210 by 90 degrees so that the first side surface of the multilayer body 210 faces the ceramic green sheet 212 for the side margin portion, the multilayer body 210 is pressed to be in close contact with the ceramic green sheet 212 for the side margin portion.

When the multilayer body 210 is pressed against the ceramic green sheet 212 for the side margin portion to transfer the ceramic green sheet 212 for the side margin portion to the multilayer body 210, the ceramic green sheet 212 for the side margin portion is formed up to a side edge portion of the multilayer body 210 due to the punched elastic material 300 formed of a rubber material, and the remaining portion may be cut.

Figure 8F:
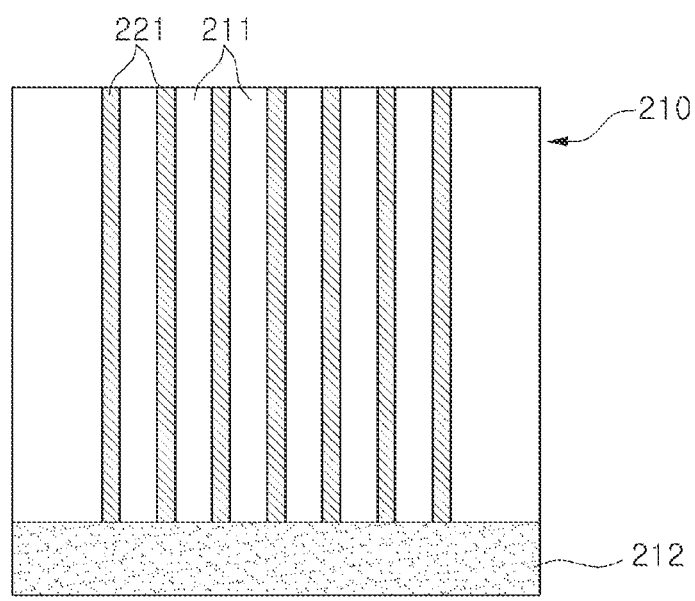

FIG. 8F illustrates that the ceramic green sheet 212 for the side margin portion is formed up to the side edge portion of the multilayer body 210.

Thereafter, the multilayer body 210 may be rotated by 180 degrees, and the above-described process may be repeated to form a second side margin portion on the second side surface of the multilayer body 210.

The ceramic green sheet 212 for the side margin portion may include a metal oxide. As the ceramic green sheet 212 for the side margin portion contains a metal oxide, a large amount of metal is prevented from leaking from the internal electrode to the side margin portion during sintering, thereby improving the internal electrode connectivity, and after reduction heat treatment, the water penetration route is blocked by allowing the metal to sufficiently aggregate in the pores of the side margin portion.

In this case, the ceramic green sheet 212 for the side margin portion may include a metal oxide in an amount of 0.06 wt % or more and 0.4 wt % or less.

If the metal oxide of the ceramic green sheet 212 for the side margin portion is less than 0.06 wt %, the effect of suppressing the leakage of metal in the internal electrodes 121 and 122 during sintering may be insufficient, and the internal electrode connectivity may be lowered, and further, moisture resistance reliability may be inferior due to insufficient blocking of the water penetration route of the side margin portion. Accordingly, the lower limit of the metal oxide of the ceramic green sheet 212 for the side margin portion may be 0.06 wt %, in detail, 0.08 wt %, and in more detail, 0.1 wt %.

On the other hand, if the metal oxide of the ceramic green sheet 212 for the side margin portion exceeds 0.4% by weight with respect to a total weight of the ceramic green sheet, failure such as short-circuits may occur, and there is a concern that a breakdown voltage (BDV) may decrease. Accordingly, the upper limit of the metal oxide of the ceramic green sheet 212 for the side margin portion may be 0.4% by weight, in detail, 0.35% by weight, and in more detail, 0.3% by weight with respect to a total weight of the ceramic green sheet.

Further, the first and second ceramic green sheets may include 0.05% by weight or less (including 0% by weight) of metal oxide with respect to a total weight of the ceramic green sheet.

If the content of metal oxide contained in the first and second ceramic green sheets exceeds 0.05% by weight with respect to a total weight of the ceramic green sheet, there is a risk that failure such as short circuits occurs or the breakdown voltage (BDV) decreases.

Next, the multilayer body 210 to which the ceramic green sheet for the side margin portion is attached may be sintered. After cooling after sintering is finished, heat treatment may be performed in a reducing atmosphere.

The metal oxide contained in the ceramic green sheet 212 for the side margin portion and the metal oxide precipitated at the grain boundaries during cooling after sintering facilitate moisture penetration, thereby deteriorating moisture resistance reliability. Therefore, by performing heat treatment in a reducing atmosphere, the metal oxide disposed at the grain boundaries is reduced to metal, so that the metal 21 is disposed in the form of particles in the pores P. Accordingly, the reliability of moisture resistance may be improved by removing metal oxides that cause water penetration and by blocking the water penetration route by agglomeration of the metal 21 in the pores P.

At this time, the step of heat treatment in the reducing atmosphere may be performed twice or more to ensure reduction of the metal oxide, and the metal oxide may be reliably reduced by adjusting the heat treatment temperature, holding time, and atmosphere of the step of heat treatment in a reducing atmosphere.

Thereafter, external electrodes may be formed on a third side surface of the body to which the first internal electrode is exposed and a fourth side surface of the body to which the second internal electrode is exposed.

EXAMPLE

A multilayer body was formed using a ceramic green sheet containing 100 nm grade $BaTiO_3$ powder and an internal electrode paste containing 120 nm grade nickel powder.

A ceramic green sheet for side margin portions, which contains 100 nm class $BaTiO_3$ powder and satisfies the NiO amount added to the 100 nm class $BaTiO_3$ powder illustrated in Table 1 below, is attached to the multilayer body, and underwent a binder burn out process in a nitrogen atmosphere at 400° C. or less and was sintered at a sintering temperature of 1200° C. or less under the conditions of 0.5% $H_2$ or less of hydrogen concentration.

After the sintering was completed and cooled, the primary heat treatment was performed for 50 hours at 900° C. and an oxygen partial pressure of $1.0 \times 10^{-12}$ Pa. After the primary heat treatment, a secondary heat treatment was performed for 2 hours at 900° C. and an oxygen partial pressure of $1.0 \times 10^{-2}$ Pa. After the secondary heat treatment, a sample chip was prepared by forming an external electrode with an external electrode paste containing Cu and glass. The size of the sample chip was 1005 (length×width×height: 1.0 mm×0.5 mm×0.5 mm).

For the sample chip, M (a ratio of the area occupied by Ni in the side margin), D (a ratio of an area occupied by a metal in the dielectric layer), and internal electrode connectivity were measured and illustrated in Table 1 below.

M and D were measured by analyzing a cross-section in the width-thickness direction (W-T cross-section) at the center of the body in the length direction with a Scanning Electron Microscope (SEM) and an Energy Disperse X-Ray Spectrometer (EDS). In detail, M is the average value obtained by observing the margin of the middle region among the regions in which the W-T cross section is divided into 3 divisions in the T direction with a magnification of 10000 at 3 views, and D is the average value obtained by observing the dielectric layer of the middle region among the regions in which the W-T cross section is divided into 3 divisions in the T direction with a magnification of 10000 at 3 views.

The internal electrode connectivity may be defined as the ratio of the actual length of the internal electrode to the total length of the internal electrode. In this case, the total length of the internal electrode is a length calculated including a portion provided due to electrode breakage, and the actual length of an internal electrode is a length calculated excluding a portion provided due to electrode breakage. For internal electrode connectivity, the average value was obtained by observing the internal electrode in the middle region of the region in which the W-T cross-section was divided into three portions in the T direction at a magnification of 10000 at 3 views.

Moisture resistance reliability evaluation was evaluated for 100 sample chips for each test number.

After applying an electric field of 5V/μm for 20 hours to each sample chip in an atmosphere of 120° C. and 95% relative humidity, the sample chip of which an insulation resistance value was lowered to 1/10 or less, compared to before the start of electric field application, was judged as a defect. The number of sample chips judged to be defective is illustrated in Table 1 below.

Breakdown voltage (BDV) evaluation was performed on 40 sample chips for each test number.

Each sample chip was connected to the circuit, and the voltage at the point at which the current became 20 mA or more was determined as BDV by sequentially boosting from 0V to 0.5V, and the number of chips with a BDV of 25V or less is illustrated in Table 1 below.

TABLE 1

| Test Number | NiO addition amount (wt %) | M (Area %) | D (Area %) | Internal electrode Connectivity | Moisture resistance reliability | BDV |
|---|---|---|---|---|---|---|
| 1* | 0 | 0.11 | 0.13 | 80% | 7 | 0 |
| 2* | 0.05 | 0.14 | 0.15 | 80% | 6 | 0 |
| 3 | 0.1 | 0.20 | 0.18 | 83% | 4 | 0 |
| 4 | 0.3 | 0.32 | 0.21 | 85% | 0 | 0 |
| 5* | 0.5 | 0.43 | 0.26 | 85% | 1 | 3 |

In the case of Test Nos. 1 and 2, the internal electrode connectivity and moisture resistance reliability were inferior as M (the ratio of the area occupied by Ni in the side margin) was equal to or less than D (the ratio of the area occupied by the metal in the dielectric layer).

Meanwhile, in the case of Test Nos. 3 to 5, it can be seen that as M>D is satisfied, internal electrode connectivity is improved and moisture resistance reliability is also excellent.

However, in the case of Test No. 5, it can be confirmed that the BDV characteristics are poor because there are too many Ni particles in the side margin portions and the dielectric layer.

As set forth above, the moisture resistance reliability was improved by controlling the total amount of the metal included in the side margin portion to be greater than the total amount of the metal included in the dielectric layer.

In addition, internal electrode connectivity was improved.

In addition, withstand voltage characteristics was improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer electronic component comprising:
  a body including a plurality of dielectric layers and having a first surface and a second surface opposing each other, a third surface and a fourth surface connected to the first surface and the second surface and opposing each other, and a fifth surface and a sixth surface connected to the first to fourth surfaces and opposing each other;
  a plurality of internal electrodes disposed inside of the body, exposed to the first surface and the second surface, and having one ends exposed to the third surface or the fourth surface;

side margin portions disposed on the first surface and the second surface; and external electrodes disposed on the third surface and the fourth surface, wherein the side margin portions and the plurality of dielectric layers include a metal, and a total amount of the metal included in the side margin portions is greater than a total amount of the metal included in the plurality of dielectric layers, an area ratio occupied by the metal in the side margin portions is defined as M, and M is 0.18 area % or more and 0.42 area % or less, and an area ratio occupied by the metal in the plurality of dielectric layers is defined as D, and D is 0.25 area % or less.

2. The multilayer electronic component of claim 1, wherein the side margin portions include a plurality of dielectric grains and pores, wherein the metal is disposed in the pores.

3. The multilayer electronic component of claim 1, wherein a diameter of the metal included in the side margin portions is 0.8 times or less of a thickness of the dielectric layer.

4. The multilayer electronic component of claim 1, wherein the metal included in the side margin portions and the plurality of dielectric layers comprises Ni.

5. The multilayer electronic component of claim 1, wherein the metal included in the side margin portions and the plurality of dielectric layers is the same as a metal included in the plurality of internal electrodes.

6. The multilayer electronic component of claim 1, wherein the side margin portions are divided into first regions adjacent to the plurality of internal electrodes and second regions adjacent to external surfaces of the side margin portions, and a total amount of the metal included in the first region is greater than a total amount of the metal included in the second region, and the total amount of the metal included in the second region is greater than the total amount of the metal included in the plurality of dielectric layers.

7. The multilayer electronic component of claim 1, wherein connectivity of the plurality of internal electrodes defined as a ratio of an actual length to a total length of the plurality of internal electrodes exceeds 80%.

8. The multilayer electronic component of claim 1, wherein among the plurality of internal electrodes, a ratio of a thickness of a region of the side margin portion in contact with an end of an outermost internal electrode with respect to a thickness of a region of the side margin portion in contact with an end of an intermediate internal electrode is 0.9 or more and 1.0 or less.

9. The multilayer electronic component of claim 1, wherein a ratio of a thickness of a region of the side margin portion contacting an edge of the body with respect to a thickness of a region of the side margin portion contacting an end of an intermediate internal electrode among the plurality of internal electrodes is 0.9 or more and 1.0 or less.

10. The multilayer electronic component of claim 1, wherein when a direction in which the first surface and the second surface oppose each other is defined as a first direction, a direction in which the third surface and the fourth surface oppose each other is defined as a second direction, and a direction in which the fifth surface and the sixth surface oppose each other is defined as a third direction, in a cross-section of the body cut in the first and third directions at a central portion of the body in the second direction, a ratio of an area occupied by the metal in the side margin portion is greater than a ratio of an area occupied by the metal in the plurality of dielectric layers.

11. The multilayer electronic component of claim 1, wherein the metal comprises nickel (Ni).

12. A multilayer electronic component comprising:

a body including a plurality of dielectric layers and having a first surface and a second surface opposing each other in a first direction, a third surface and a fourth surface connected to the first surface and the second surface and opposing each other in a second direction, and a fifth surface and a sixth surface connected to the first to fourth surfaces and opposing each other in a third direction;

a plurality of internal electrodes disposed inside of the body, exposed to the first surface and the second surface, and having one ends exposed to the third or fourth surfaces;

side margin portions disposed on the first surface and the second surface; and external electrodes disposed on the third surface and the fourth surface, wherein in a cross-section taken in the first and third directions in a central portion of the body in the second direction, when defining an area ratio occupied by a metal in the side margin portions as M and an area ratio occupied by a metal in the plurality of dielectric layers as D, M>D is satisfied, M is 0.18 area % or more and 0.42 area % or less, and D is 0.25 area % or less.

13. The multilayer electronic component of claim 12, wherein the M is greater than the D by 0.02 area % or more.

14. The multilayer electronic component of claim 12, wherein the side margin portions are divided into a first region adjacent to the plurality of internal electrodes and a second region adjacent to an external side surface of the side margin portions, wherein when defining an area ratio occupied by a metal in the first region as M1 and an area ratio occupied by a metal in the second region as M2, M1>M2>D is satisfied.

15. The multilayer electronic component of claim 12, wherein the metal comprises nickel (Ni).

* * * * *